(12) United States Patent
Alam et al.

(10) Patent No.: US 10,799,884 B2
(45) Date of Patent: Oct. 13, 2020

(54) WET ELECTROSTATIC PRECIPITATOR AND METHOD OF TREATING AN EXHAUST

(71) Applicant: Ohio University, Athens, OH (US)

(72) Inventors: Khairul Alam, Athens, OH (US); Hajrudin Pasic, Athens, OH (US)

(73) Assignee: Ohio University, Athens, OH (US)

( * ) Notice: Subject to any disclaimer, the term of this patent is extended or adjusted under 35 U.S.C. 154(b) by 319 days.

(21) Appl. No.: 15/518,523

(22) PCT Filed: Oct. 15, 2015

(86) PCT No.: PCT/US2015/055623
§ 371 (c)(1),
(2) Date: Apr. 12, 2017

(87) PCT Pub. No.: WO2016/061290
PCT Pub. Date: Apr. 21, 2016

(65) Prior Publication Data
US 2017/0232450 A1 Aug. 17, 2017

Related U.S. Application Data

(60) Provisional application No. 62/064,723, filed on Oct. 16, 2014, provisional application No. 62/183,352, filed on Jun. 23, 2015.

(51) Int. Cl.
*B03C 3/53* (2006.01)
*B01D 47/02* (2006.01)
(Continued)

(52) U.S. Cl.
CPC ............. *B03C 3/53* (2013.01); *B01D 47/027* (2013.01); *B01D 53/507* (2013.01); *B01D 53/56* (2013.01);
(Continued)

(58) Field of Classification Search
CPC combination set(s) only.
See application file for complete search history.

(56) References Cited

U.S. PATENT DOCUMENTS 2,555,216 A  5/1951  Wintermute
3,815,336 A  6/1974  Rigo
(Continued)

FOREIGN PATENT DOCUMENTS

| EP | 0808660 A1 | 11/1997 |
|---|---|---|
| EP | 2246117 A1 | 11/2010 |
| EP | 2614894 A1 | 7/2013 |

OTHER PUBLICATIONS

International Search Report and Written Opinion From Corresponding PCT Appln No. US/2015/055623 dated Jan. 27, 2016 (15 pages).

*Primary Examiner* — Christopher P Jones
*Assistant Examiner* — Sonji Turner
(74) *Attorney, Agent, or Firm* — Wood Herron & Evans LLP (57) ABSTRACT

A fluid processing system and method of processing a fluid includes a tank having an outer wall, a heating element, and an insulating element. The heating element is situated within the tank and includes a first electrode and a second electrode. The insulating element is positioned between the first electrode and the second electrode. As such, powering the heating element directs an electric current through the fluid within the tank for heating the fluid, while the insulating element provides electrical and thermal insulation to the outer wall of the tank.

24 Claims, 9 Drawing Sheets

(51) Int. Cl.
    *B03C 3/78*     (2006.01)
    *B03C 3/16*     (2006.01)
    *B01D 53/56*     (2006.01)
    *B01D 53/62*     (2006.01)
    *B01D 53/64*     (2006.01)
    *B01D 53/50*     (2006.01)
    *B01D 53/78*     (2006.01)

(52) U.S. Cl.
    CPC ............. *B01D 53/62* (2013.01); *B01D 53/64* (2013.01); *B01D 53/78* (2013.01); *B03C 3/16* (2013.01); *B03C 3/78* (2013.01)

(56) References Cited

U.S. PATENT DOCUMENTS

| | | | | |
|---|---|---|---|---|
| 4,189,308 | A * | 2/1980 | Feldman | B03C 3/53 95/75 |
| 4,441,897 | A * | 4/1984 | Young | B03C 3/16 428/118 |
| 5,137,546 | A * | 8/1992 | Steinbacher | B03C 3/017 95/71 |
| 5,792,235 | A | 8/1998 | Kohr | |
| 5,846,301 | A | 12/1998 | Johnson et al. | |
| 6,193,782 | B1 | 2/2001 | Ray | |
| 6,231,643 | B1 * | 5/2001 | Pasic | B03C 3/47 95/75 |
| 6,783,575 | B2 * | 8/2004 | Pasic | B03C 3/16 96/44 |
| 6,878,192 | B2 | 4/2005 | Pasic | |
| 7,632,341 | B2 * | 12/2009 | Triscori | B01D 53/32 95/71 |
| 7,763,101 | B2 * | 7/2010 | Maekawa | B03C 3/08 261/110 |
| 8,088,198 | B2 * | 1/2012 | Bengtsson | B03C 3/025 95/71 |
| 8,790,444 | B2 * | 7/2014 | Ellis | B01D 53/1456 95/65 |
| 8,865,098 | B2 * | 10/2014 | Suchak | F23J 15/04 423/210 |
| 9,440,188 | B2 * | 9/2016 | Suchak | F01N 3/04 |
| 9,821,320 | B2 * | 11/2017 | Ellis | B01D 53/1456 |
| 2003/0217642 | A1 | 11/2003 | Pasic et al. | |
| 2009/0241781 | A1 | 10/2009 | Triscori et al. | |

* cited by examiner

WET ELECTROSTATIC PRECIPITATOR AND METHOD OF TREATING AN EXHAUST

PRIORITY CLAIM

This application is a National Stage Entry under 35 U.S.C. § 371 of PCT Application No. PCT/US2015/055,623, filed on Oct. 15, 2015, which claims priority to U.S. Provisional Application No. 62/064,723 filed Oct. 16, 2014 and U.S. Provisional Application No. 62/183,362, filed Jun. 23, 2015, all of which are incorporated herein by reference in their entireties.

TECHNICAL FIELD

The present invention relates generally to a wet electrostatic precipitator and method of treating an exhaust, and more particularly, to a plurality of sieves for treating an exhaust.

BACKGROUND

Traditional electrostatic precipitators and scrubbers are widely used for treating an exhaust containing gaseous pollutants and/or particulate emissions. For example, industrial processes, such as power and heat generation, may generate environmentally harmful particulate and gaseous emissions that may remain suspended in the air. These emissions often present health hazards when inhaled by humans and animals. Also, the particulate emissions tend to settle on equipment and buildings and may cause discoloration or even interfere with the proper function of the equipment. As such, it is important to remove these particulate emissions from the exhaust.

In addition, the exhaust may be further treated by a traditional heat exchanger for recovering thermal energy from the exhaust. After all, many industrial processes discharge exhaust into the environment at an elevated temperature and recovering this thermal energy provides for an opportunity to improve the efficiency of the industrial process. Industrial processes capable of discharging exhaust containing gaseous pollutants at an elevated temperature may also be fitted with scrubber and/or a wet electrostatic precipitator ("wet ESP") to both remove gaseous pollutants, such as particulate emissions, and recover thermal energy. Wet electrostatic precipitators typically include a liquid, such as water, to capture both particulate and gaseous emissions as well as thermal energy, which may be directed through a heat exchanger for improved efficiency.

While electrostatic precipitators, scrubbers, and heat exchangers are generally known for use with industrial processes, the effectiveness of treating the exhaust has been limited, at least to some extent, by traditional design limitations and the wide variety of different components necessary for treatment. For example, electrostatic precipitators, scrubbers, and heat exchangers configured for treating exhaust typically require unique alloys and coatings that increase overall cost and limit available space. Thus, the amount of surface area available to any one of the precipitators, scrubbers, and heat exchangers is reduced and, similarly, reduces the effectiveness of the treatment. In addition, traditional wet electrostatic precipitators often produce a liquid mist that increases the likelihood of electrically shorting one or more electrodes, which also reduces its effectiveness for collecting particulate emissions.

There is a need for an electrostatic precipitator and method of treating an exhaust that improves treatment effectiveness, reduces complexity, reduces costs, and addresses present challenges and characteristics such as those discussed above.

SUMMARY

An exemplary embodiment of a wet electrostatic precipitator for reducing particulate emissions from an exhaust includes a flow chamber, which defines a flow path, and a plurality of sieves. The plurality of sieves are positioned within the flow chamber and arranged relative to each other to define a plurality of gaps for receiving the exhaust. Each of the sieves includes a liquid permeable material extending therealong. The liquid permeable material is configured to receive a liquid such that the liquid flows along the liquid permeable material for treating the exhaust.

In one aspect of an exemplary embodiment of the wet electrostatic precipitator, each of the plurality of sieves includes an inlet for receiving the liquid and an outlet for discharging the liquid. Thus, a liquid collector is positioned proximate to the outlet of each of the plurality of sieves to collect the liquid. The wet electrostatic precipitator also includes a heat exchanger fluidly connected to the liquid collector. The heat exchanger is configured to receive the liquid from the liquid collector after having been heated by the exhaust to recover a thermal energy therefrom.

In another aspect of an exemplary embodiment of the wet electrostatic precipitator, each of the plurality of sieves includes an inlet for receiving the liquid and an outlet for discharging the liquid. Thus, a liquid collector is positioned proximate to the outlet of each of the plurality of sieves to collect the liquid. Also, the plurality of sieves are configured to generate a condensate from the exhaust such that the liquid and the condensate flow together into the liquid collector. The wet electrostatic precipitator further includes a pump fluidly connected to the liquid collector and the inlet such that the pump directs the liquid and the condensate from the liquid collector to the inlet for reuse.

Yet another aspect of an exemplary embodiment of the wet electrostatic precipitator has the plurality of sieves being electrically grounded. The wet electrostatic precipitator also includes a plurality of discharge electrodes positioned proximate to the plurality of sieves and electrically connected to a current supply. As such, the plurality of discharge electrodes charges a plurality of particulates with a plurality of charged particles flowing with the exhaust. In turn, the charged plurality of particulates accumulates on the plurality of sieves.

An exemplary embodiment of a sieve assembly for treating an exhaust includes a plurality of sieves. The plurality of sieves is arranged relative to each other to define a plurality of gaps therebetween for receiving the exhaust. Each of the sieves includes a liquid permeable material extending therealong. The liquid permeable material is configured to receive a liquid such that the liquid flows along the liquid permeable material for treating the exhaust.

In one aspect of an exemplary embodiment of the sieve assembly, each of the sieves includes a liquid permeable material defining a sleeve such that at least a portion of the sleeve is hollow. In another aspect of an exemplary embodiment, each of the sieves includes a core, and the liquid permeable material generally surrounds at least a portion of the core. Thereby, the core supports the liquid permeable material. In yet another aspect of an exemplary embodiment, the liquid permeable material is in the form of elongated cordage.

In use, a method of treating an exhaust with the plurality of sieves includes directing the exhaust toward the plurality of sieves and flowing the liquid to the liquid permeable material. The method also includes absorbing the liquid within the liquid permeable material and permeating the fluid along the liquid permeable material such that the liquid flows therealong. Furthermore, the method includes impacting the exhaust against the liquid flowing along the liquid permeable material in order to treat the exhaust.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below serve to explain the invention.

DETAILED DESCRIPTION

Figure 1:
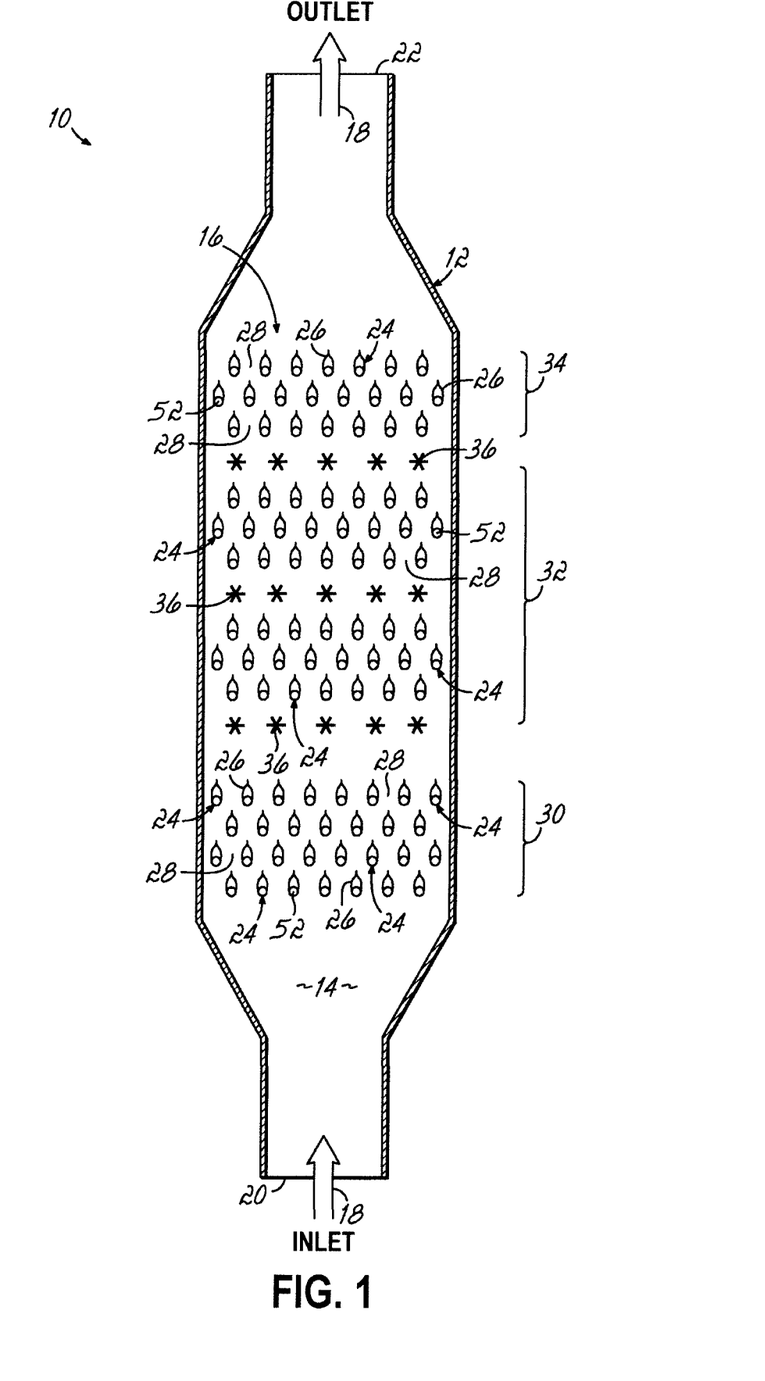
FIG. 1 is a schematic cross-sectional view of a first exemplary embodiment of a wet electrostatic precipitator.

With reference to FIG. 1, a first exemplary embodiment of a wet electrostatic precipitator 10 includes a duct 12 having a flow chamber 14 and a sieve assembly 16. The sieve assembly 16 is positioned within the flow chamber 14 to define a flow path 18 therethrough. The sieve assembly 16 is arranged within the flow chamber 14 to coordinate a three stage method of treating an exhaust flowing through the duct 12 from a duct inlet 20 toward a duct outlet 22. According to the exemplary embodiment, the exhaust has excess thermal energy and a plurality of particulate and gaseous emissions, both of which may be removed and recovered from the exhaust during treatment. The sieve assembly 16 includes a plurality of sieves 24. Each of the sieves 24 includes a liquid permeable material 26 that partially obstructs the exhaust flowing along the flow path 18. The plurality of sieves 24 also defines a plurality of gaps 28 therebetween for receiving the exhaust flowing from the duct inlet 20 to the duct outlet 22. Furthermore, each of the sieves 24 is configured to receive a liquid, such as water or an alkali solution so that the liquid flows, by gravity and/or capillary action, along the liquid permeable material 26. Thereby, the plurality of particulate and gaseous emissions (e.g., $NO_x$, $SO_x$, $CO_2$, and Mercury) and excess thermal energy passing through the duct 12 accumulates within the liquid for treating the exhaust, which may then be discharged to the environment. According to the exemplary embodiment, the plurality of sieves 24 recovers particulate emissions, gaseous emissions, and thermal energy from the exhaust. However, it will be appreciated that the any number of sieves 24 may be used in any number of arrangements and dedicated to scrubbing and/or recovery and removal of either one or both of the emissions or thermal energy. As such, the term "treatment" is not intended to limit the invention described herein.

A first stage of treatment includes a first portion 30 of the sieve assembly 16 positioned proximate to the duct inlet 20. As such, the first stage of treatment is upstream of a second stage and a third stage of treatment, which includes second and third portions 32, 34 of the sieve assembly 16, respectively. The first stage of treatment includes the first portion 30 of the sieve assembly 16 configured to remove the plurality of particulate emissions from the exhaust via impaction and act as a scrubber, while also removing thermal energy from the exhaust. In contrast, the second stage of treatment includes the second portion 32 of the sieve assembly 16, which is electrically grounded, and a plurality of discharge electrodes 36 positioned proximate to the sieve assembly 16. The plurality of discharge electrodes 36 is configured to generate negatively-charged particles that attach to the particulate emissions within the exhaust. In turn, the second portion 32 of the sieve assembly 16 attracts the negatively-charged particulate emissions, which then accumulate thereon for removal from the exhaust. Finally, in the third stage of treatment, the third portion 34 of the plurality of sieves 24 repeats the first stage of treatment for a final recovery of particulate emissions and thermal energy. Notably, any liquid and condensate that may form on the sieve assembly 16 may be recycled and reused for future treatment of additional exhaust as discussed below in greater detail.

With respect to the plurality of discharge electrodes 36, it will be appreciated that the particulate emissions are generally given a negative electrical charge by passing these particulate emissions through a region in which gaseous ions flow (i.e., a corona). More specifically, an electrical field forms between the discharge electrodes 36 and the grounded liquid permeable material 26, which is conductive due to the liquid flowing therealong. Each of the discharge electrodes 36 is operatively connected to an electrical current supply in order to maintain a high voltage between the discharge electrodes 36 and the liquid permeable material 26, which acts as a collection electrode. Thus, it will be appreciated that the wet electrostatic precipitator 10 further includes electrical equipment for generating a high-voltage supply, such as a high-voltage transformer and a rectifier. These and other components may be operatively connected to the discharge electrodes 36 and liquid permeable material 26 as is presently understood in the state of the art. Alternatively, each of the sieves 24 may further include a collection electrode, such as the frame member 52, (See FIG. 3) positioned proximate to the permeable material, which may be electrically grounded for attracting the negatively charged particulate emissions. In addition, a metal wire may be integrated into the sieves 24 for improved conductivity and grounding. It will be further appreciated that the corona may be positively or negatively charged and, in this respect, any charge may be used in accordance with the invention described herein. As such, the invention is not intended to be limited only to the negative charges discussed above.

FIGS. 2-5A show a second exemplary embodiment of a wet electrostatic precipitator 110 (no discharge electrodes are shown) having the first portion 30 of the plurality of sieves 24. As discussed briefly above, the plurality of sieves 24 are arranged to define the plurality of gaps 28 through which the exhaust flows from a duct inlet 120 to a duct outlet 122 with like numbers indicating like features discussed above. According to the exemplary embodiment, the liquid permeable material 26 defines a sleeve 37 and is between approximately 1 millimeter and approximately 2 millimeters thick. As such, many, if not all, of the gaps 28 are less than approximately one inch. More particularly, the gaps 28 are between approximately two millimeters and approximately 5 millimeters. According to the exemplary embodiment, at least a portion of the sleeve 37 is hollow and, more particularly, the sleeve 37 is generally hollow. However, it will be appreciated that thinner sleeves 37 have more surface area per volume than thicker sleeves 37. Therefore, a desirable number of sieves 24 and the geometry of the sleeves 37 may be optimized for improved performance, such as ESP collection efficiency, pressure drop, production cost, etc.

Figure 2:
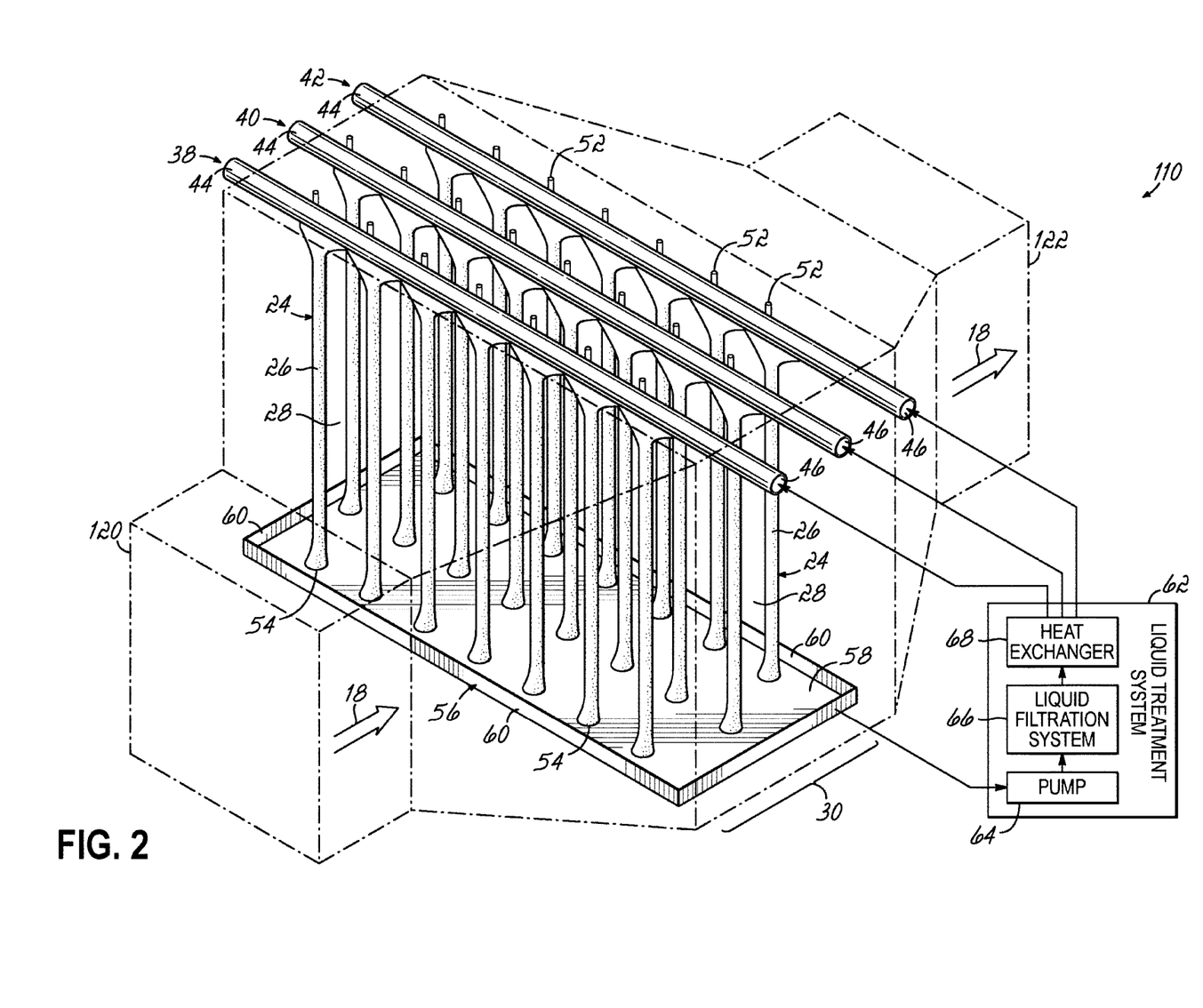
FIG. 2 is a perspective view of a second exemplary embodiment of a wet electrostatic precipitator.

The first portion 30 of the sieve assembly 16 includes first, second, and third sieve arrangements 38, 40, 42 of seven, eight, and seven sieves 24, respectively. The exemplary embodiment, each of the sieve arrangements 38, 40, 42, includes sieves 24 offset and parallel from each other along a linear row. Notably, the plurality of sieves 24 are oriented generally vertically and, as such, perpendicular to the flow direction of the exhaust. While the sieves 24 are distributed about the flow chamber 14 generally evenly to define like gaps 28, it will be appreciated that more or less sieves 24 may be used with varying orientation and placement within the duct 12.

Figure 3:
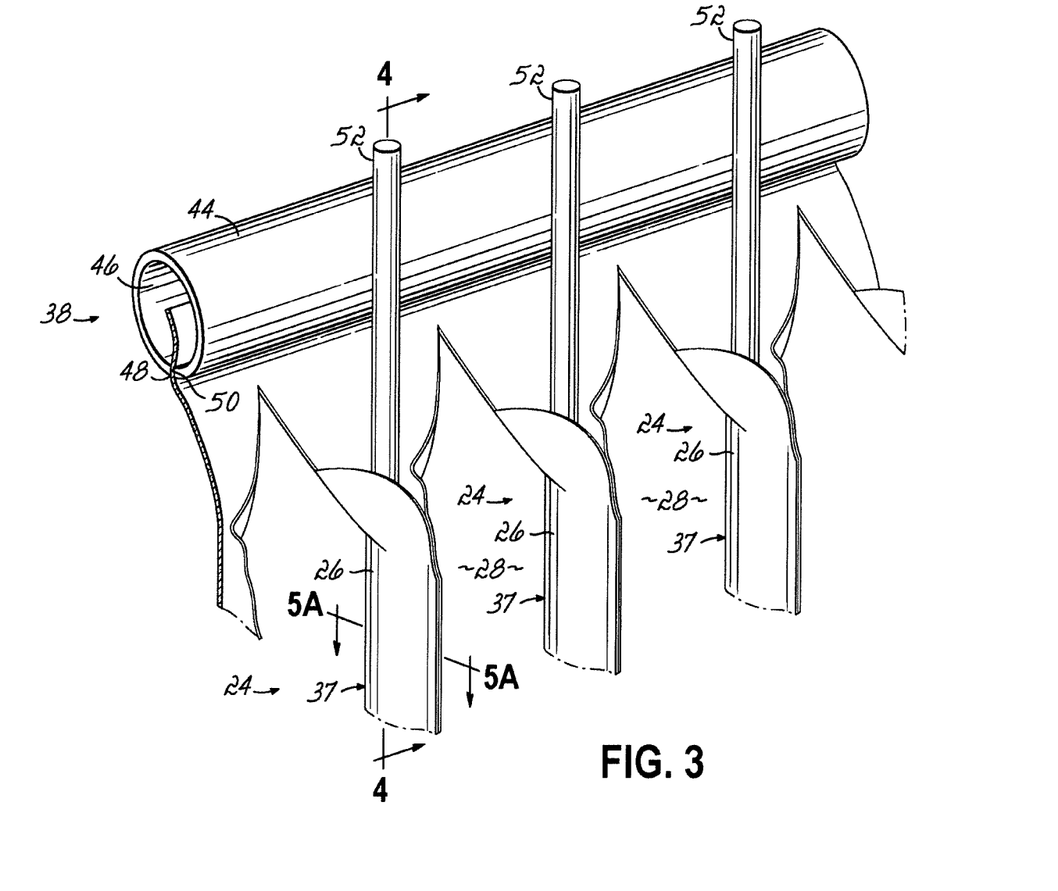
FIG. 3 is an enlarged perspective view of a sieve assembly of the wet electrostatic precipitator of FIG. 2.

With respect to FIG. 2 and FIG. 3, each sieve arrangement 38, 40, 42 includes the generally horizontally extending support member 44, which defines a liquid supply conduit 46 extending therethrough. Furthermore, an elongate slot 48 extends longitudinally along a length of the support member 44. The slot 48 extends through the support member 44, into the liquid supply conduit 46, and is configured to receive the liquid permeable material 26 of the sieve 24 and fasten therein. Thereby, the support member 44 supports the generally vertical orientation of the sleeve 37 of the liquid permeable material 26, while the slot 48 further defines a sieve inlet 50 through which liquid is introduced into liquid permeable material 26. Alternatively, the sieve inlet 50 may further include a tube 51 extending from and in fluid communication with the liquid supply conduit 46 to the remainder of the sieve 24. According to the exemplary embodiment, the support member 44 and the liquid supply conduit 46 are in the collective form of a single elongate tube; however, it will be appreciated that another structure for supporting the sieves 24 and providing for the supply of liquid to the sieve inlet 50 may be so used.

While the sieves 24 include the sleeve 37 of liquid permeable material 26 supported by the support member 44, the exemplary embodiment further includes a frame member 52 extending therealong to further support the liquid permeable material 26. Specifically, the liquid permeable material 26 for each of the sieves 24 of the respective sieve arrangements 38, 40, 42 joins together as a single, unitary inlet end of liquid permeable material 26, which is fastened to the support member 44 within the slot 48. The liquid permeable material 26 extends from the slot 48 and away from the support member 44 toward the frame member 52. At each of the sieves 24, the liquid permeable material 26 envelops the frame member 52. In turn, the liquid permeable material 26 extends along the frame member 52 such that the frame member 52 supports the liquid permeable material 26 against the exhaust flow. The liquid permeable material 26 and the frame member 52 further extend away from the support member 44 to a sieve outlet 54. According to the exemplary embodiment, the sieve inlet and outlet 50, 54 are opposing end portions of the liquid permeable material 26. However, it will be appreciated that the sieve inlet and outlet 50, 54 may alternatively include or additionally include further structures, which may define, respectively, the inlet and outlet.

Figure 4:
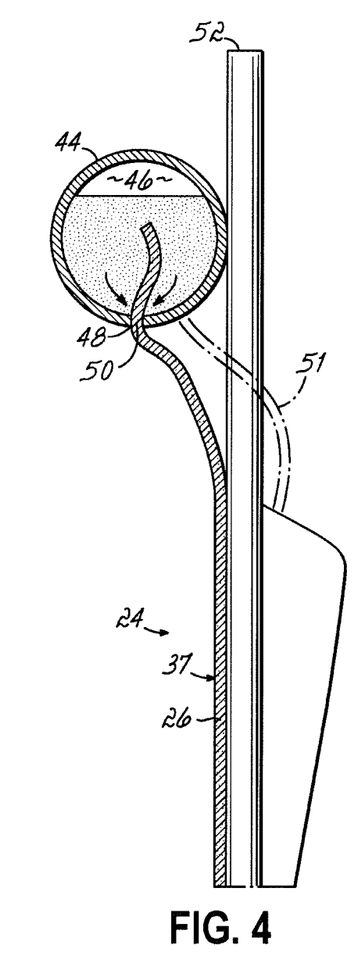
FIG. 4 is a cross-sectional view of the sieve assembly taken along section line 4-4 of FIG. 3.
Figure 5A:
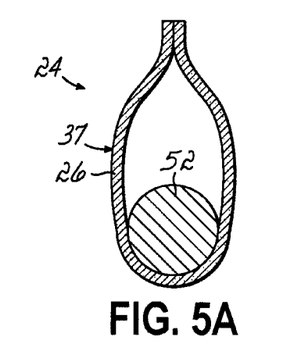
FIG. 5A is a cross-sectional view of the sieve assembly taken along section line 5A-5A of FIG. 3.

FIG. 4 and FIG. 5A show the sleeve 37 of liquid permeable material 26 wrapped around the frame member 52 for supporting the liquid permeable material 26 against the flow of the exhaust. Notably, the liquid permeable material 26 has a length in the direction of the exhaust flow that is greater than its width for reducing drag while increasing an amount of available surface area, which contacts the exhaust. Thus, the increased surface area provides for more contact with the liquid flowing along the liquid permeable material 26 to remove and recover more particulate emissions and thermal energy. According to the exemplary embodiment, the liquid permeable material 26 is a thermoplastic material formed from a fibrous felt mat, such as a polypropylene fibrous felt mat, which resists various alkali and acids. However, other liquid permeable materials configured for providing for the flow of liquid exposed to the exhaust may be similarly used. For example, polypropylene sulfide ("PPS") material and/or polyether ether ketone ("PEEK") material may alternatively be used to accommodate a greater range of exhaust temperatures, such as relatively high exhaust temperatures.

Figure 5B:
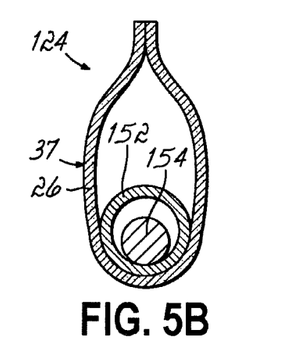
FIG. 5B is a cross-sectional view similar to FIG. 5A, but showing another embodiment of a sieve assembly.

According to the exemplary embodiment, the frame member 52 is in the form of a rigid rod and the sleeve 37 wraps loosely around the frame member 52. However, it will be appreciated the rod may alternatively be semi-rigid or even flexible. Alternatively, the frame member 52 may be a hollow tubular support configured to provide for a supply of liquid at a desirable pressure into the sleeve 37. Such a hollow tubular support may provide for improved flushing and removal of particulate deposits from holes therein and/or improved scrubbing of gaseous emissions. By way of example, FIG. 5B shows another exemplary embodiment of a frame member 152 in the form of a hollow rod, which itself is supported by a flexible cable 154, such as a rope. In this respect it will be appreciated that alternative frame members may be used for further supporting the liquid permeable material 26. Furthermore, as discussed above with respect to FIG. 1 and FIG. 3, in the case that the frame member 52 also acts as the collection electrode, the frame member 52 is also electrically grounded and formed from a conductive material.

With respect to FIG. 2, the wet electrostatic precipitator 110 further includes a liquid collector 56 positioned proximate to the sieve outlets 54 for collecting the liquid being discharged from the sieve outlets 54. According to the exemplary embodiment, the liquid collector 56 is in the form of a tray 56 that includes a bottom 58 and surrounding sidewalls 60 configured to guide the liquid to a liquid treatment system 62. According to the exemplary embodiment, the liquid treatment system 62 includes a pump 64, a filtration system 66, and a heat exchanger 68. Alternatively or in addition to the pump 64, the filtration system 66, and the heat exchanger 68, the liquid treatment system 62 may include a blowdown system for reducing particulates within the liquid. The pump 64 is configured to direct the liquid from the liquid collector 56 to the filtration system 66, which is configured to remove particulate emissions from the liquid. The pump 64 then continues to direct the liquid through the heat exchanger 68 for recovering thermal energy from the liquid. While the liquid may be removed from the wet electrostatic precipitator 110, the liquid may also be redirected back into the liquid supply conduit 46 for reuse through the liquid permeable material 26, as illustrated schematically in FIG. 2. It will be appreciated that the pump 64, filtration system 66, and heat exchanger 68 may be selected and assembled in order to accommodate any performance requirements for treating the exhaust of any given industrial process. For this reason, the pump 64, filtration system 66, and heat exchanger 68 may be selected and assembled per known requirements readily appreciated by those having ordinary skill in the art.

According to the exemplary embodiment, the liquid is supplied to the wet electrostatic precipitator 110 during assembly thereof for an initial use. While a portion of the liquid may evaporate during use, particularly because the liquid permeable material 26 is exposed directly to the exhaust, the temperature differential between a relatively humid exhaust and the liquid permeable material 26 also generates a condensate to form on the liquid permeable material 26. In turn, the liquid and the condensate will flow simultaneously into the tray 56 and the liquid treatment system 62 for reuse through the wet electrostatic precipitator 110. In other words, any liquid losses may be offset by the addition of the condensate from the flue gas. Of course, in the event that too little or too much liquid flows through the wet electrostatic precipitator 110, the plurality of sieves 24 are fluidly connected to a liquid supply (not shown) for additional liquid or a liquid drain (not shown) for removal, respectively. Alternatively, the plurality of sieves 24 may only be fluidly connected to the liquid supply (not shown) if reuse of the liquid and/or condensate is not desirable. Furthermore, in the event that the electrostatic precipitator 110 is configured to treat the exhaust in stages, then a variety of liquids, such as ammonia, amine, etc., may be supplied for each of the stages, in which the liquid collector 56 may have one or more additional compartments for collecting the variety of liquids, respectively.

Figure 5C:
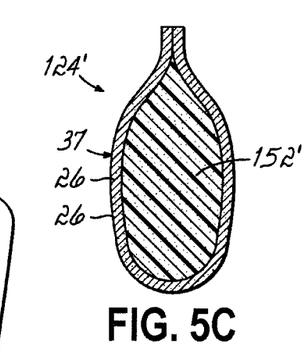
FIG. 5C is a cross-section view similar to FIG. 5A, but showing yet another embodiment of a sieve assembly.
Figure 5D:
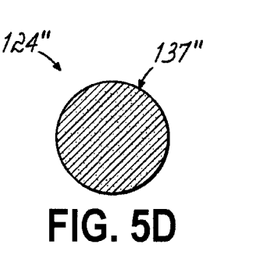
FIG. 5D is a cross-section view similar to FIG. 5A, but showing still another embodiment of a sieve assembly.

FIG. 5C and FIG. 5D show additional embodiments of a sieve 124', 124". With respect to FIG. 5C, the sieve 124' includes the sleeve 37 of liquid permeable material 26 wrapped around a core 152'. The sleeve 37 of the liquid permeable material 26 generally surrounds at least a portion of the core 152'. Thereby, the sleeve 37 is attached to and supported by the core 152' such that the sleeve 37 maintains a predetermined shape regardless of being attached to one or more support members. According to an exemplary embodiment, the core 152' is a foam material, but may be any generally rigid material for supporting the sleeve 37 thereon.

Figure 9:
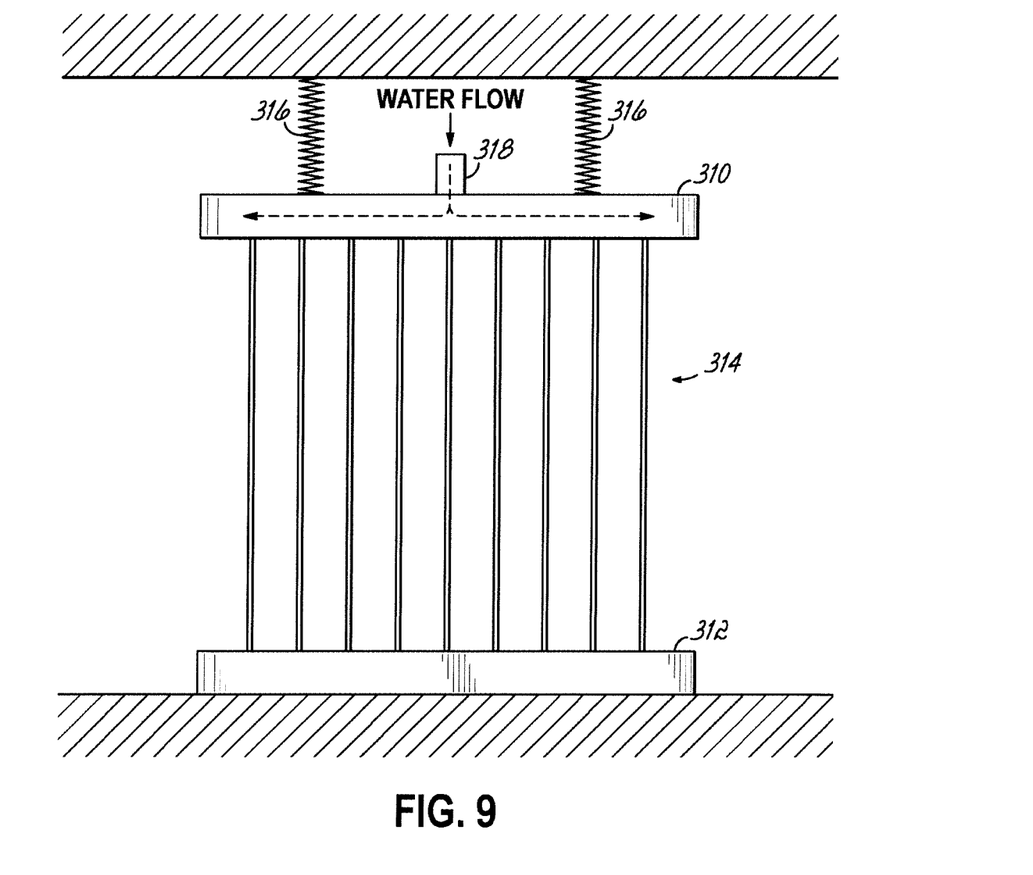
FIG. 9 is a diagrammatic depiction of a sieve assembly for use in the present invention.

One of the preferred embodiments of a sieve is to use the liquid permeable material in the form of elongated cordage such as twisted or braided rope. FIG. 9 shows a set of ropes 314 stretched to be in tension between two support members 310 and 312. This set of ropes is the sieve system. However the tension mechanism is not limited to springs 316 as shown in the figure; other mechanisms that keep the ropes in tension can be used.

Figure 5E:
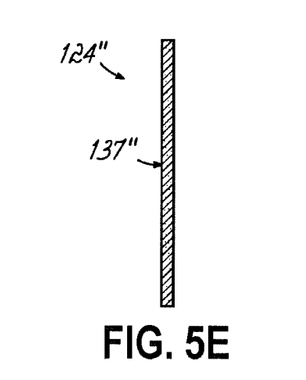
FIG. 5E is a cross-section view similar to FIG. 5A but showing still another embodiment of the sieve assembly.
Figure 10:
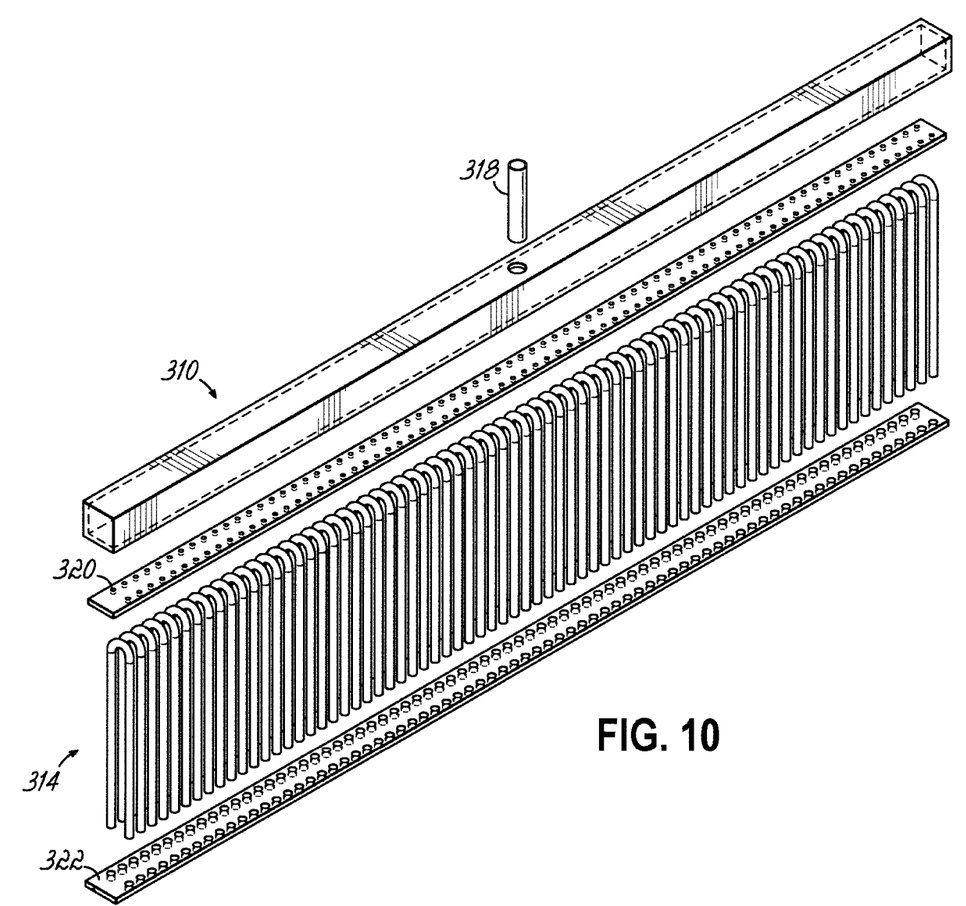
FIG. 10 is an isometric view of a water delivery system for use in the present invention.

FIG. 10 shows the details of how the hollow top support delivers liquid from the water inlet 318 to the ropes 316 through a set of holes 320 in the top panel 322. The holes act as a pressure adjuster. Bottom panel 324 acts as a spacer. For this embodiment, FIG. 5D shows the cross-section of the sieve 124" which is the liquid permeable material 26 in the form of an elongated cordage 137", such as a rope. The cordage can have circular cross section or other shapes, such as a rectangular tape or strip as shown in FIG. 5E. It will be appreciated that the liquid permeable material may be formed into alternative structures configured to receive and encourage the flow of liquid therealong.

Figure 6:
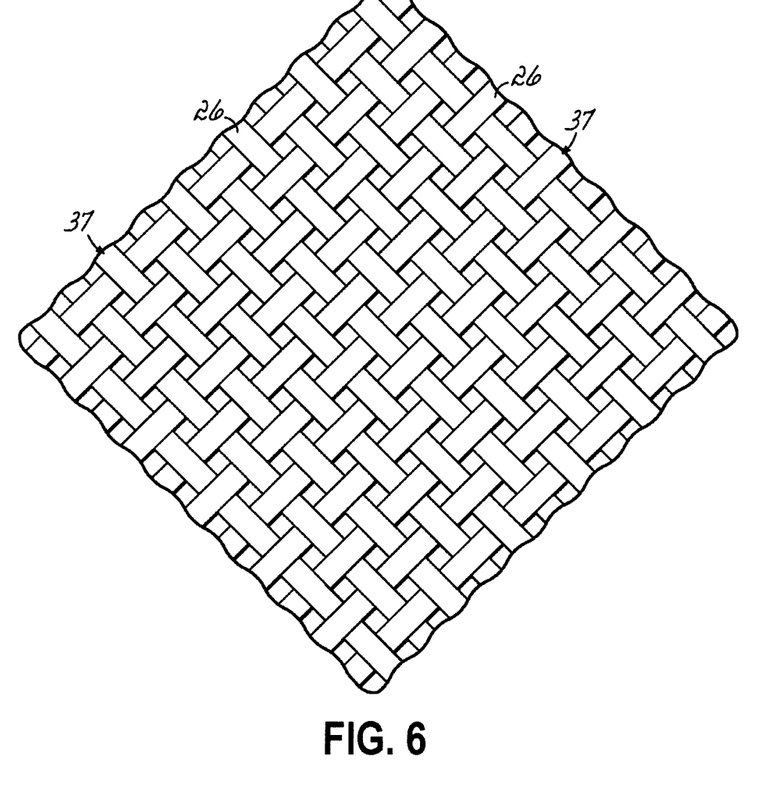
FIG. 6 is an exemplary embodiment of a woven liquid permeable material.

In addition to the liquid permeable material 26 being formed according to various embodiments from a mat or a rope, as discussed above, the liquid permeable material 26 may also be woven as shown in FIG. 6. With respect to the woven material, also referred to herein as a braided sleeve 37, the braided sleeve 37 may have greater strength than the mat material and further disrupt the liquid flowing therealong for increased surface area and, in turn, improved capture of particulate emissions. According to an exemplary embodiment, the braided sleeves 37 may be oriented at any desirable angle and even form a "net-like" plurality of sieves 37. For example, two or more generally parallel rows of woven liquid permeable material 26 may extend together in tension between support members, such as by being attached to both the support member 44 and the bottom 58, shown in FIG. 2.

Figure 7:
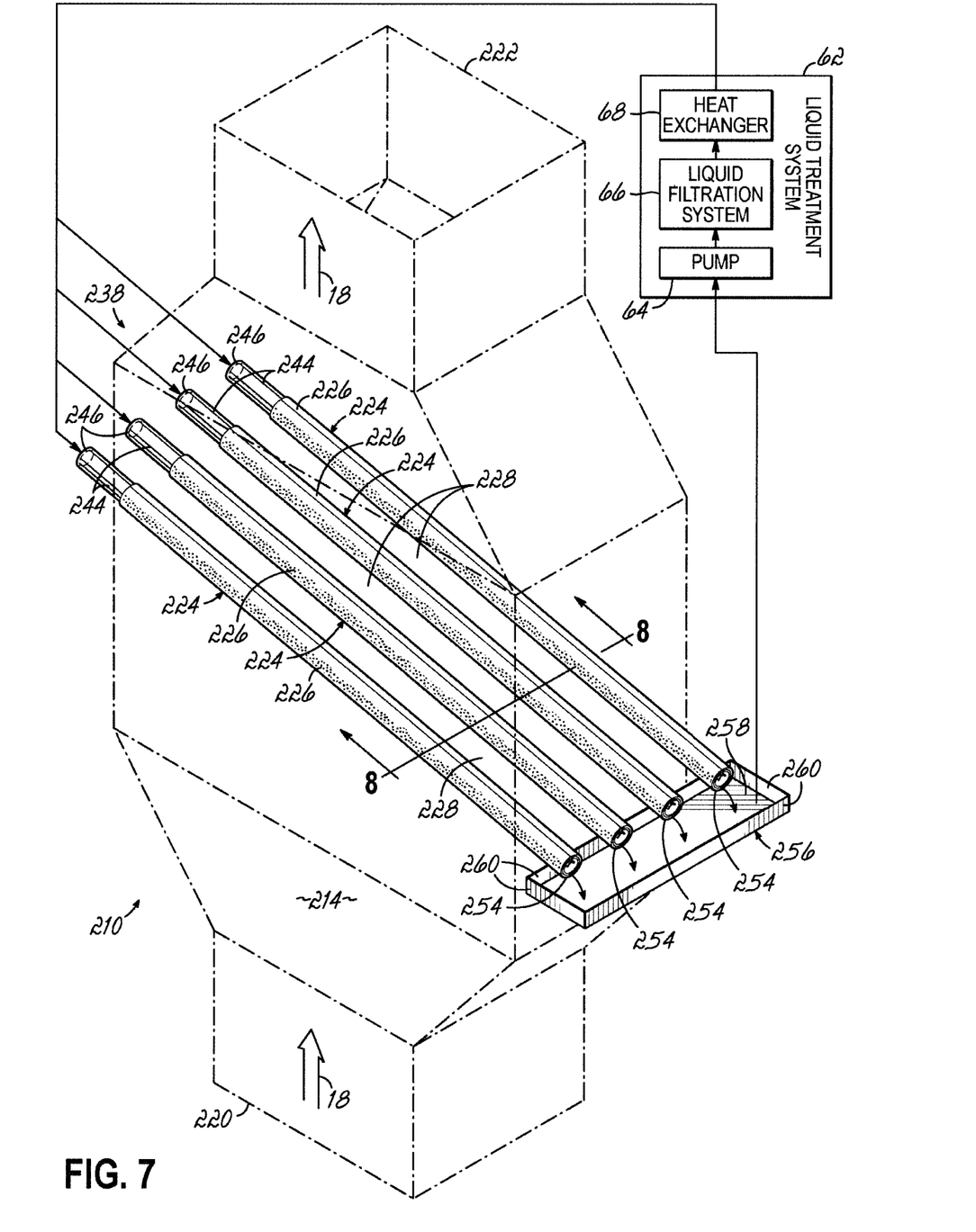
FIG. 7 is a perspective view of a third exemplary embodiment of a wet electrostatic precipitator.
Figure 8:
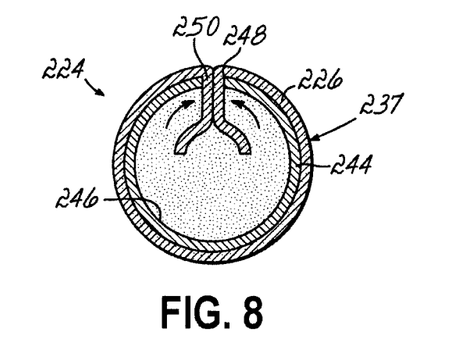
FIG. 8 is a cross-sectional view of the wet electrostatic precipitator taken along section line 8-8 of FIG. 7.

FIG. 7 and FIG. 8 show a third exemplary embodiment of a wet electrostatic precipitator 210 (no discharge electrodes are shown) and an arrangement 238 of a plurality of sieves 224. As discussed briefly above with respect to alternative embodiments, the plurality of sieves 224 is arranged to define a plurality of gaps 228 through which the exhaust flows from a duct inlet 220 to a duct outlet 222 with like numbers indicating like features discussed above. More particularly, the arrangement 238 of the plurality of sieves 224 includes four sieves 224. According to the exemplary embodiment, the sieve arrangement 238 includes the sieves 224 offset and parallel from each other along a linear row. Notably, the plurality of sieves 224 are oriented generally horizontally and, as such, generally perpendicular to a flow direction of the exhaust. While the sieves 224 are distributed about a flow chamber 214 generally evenly to define like gaps 228, it will be appreciated that more or less sieves 24 may be used with varying orientation and placements within the duct 12. As defined herein, the terms "generally vertically" and "generally horizontally" may also include a horizontal component and vertical component, respectively. For example, as shown in FIG. 6, the exemplary embodiment of the arrangement 238 is generally horizontal but includes a vertical component to encourage flow via gravitation. Thereby, the arrangement 238 is configured for treating a generally vertical flowing exhaust (i.e., a vertical flow ESP).

The sieve arrangement 238 includes a generally horizontally extending support member 244, which defines a liquid supply conduit 246 extending therethrough. Furthermore, an elongate slot 248 extends longitudinally along a length of the support member 244. The slot 248 extends through the support member 244, into a liquid supply conduit 246, and is configured to receive a liquid permeable material 226 of the sieve 224 and fasten therein. Thereby, the support member 244 supports the generally horizontal orientation of the liquid permeable material 226, while the slot 248 further defines a sieve inlet 250 through which liquid is introduced into liquid permeable material 226. According to the exemplary embodiment, the support member 244 and the liquid supply conduit 246 are in the collective form of a single elongate tube; however, it will be appreciated that another structure for supporting the sieves 224 and providing for the supply of liquid to the sieve inlet 250 may be so used.

The liquid permeable material 226 for each of the sieves 224 of the arrangement 238 joins together as a single, unitary inlet end portion 250 of liquid permeable material 226, which is fastened to the support member 244 within the slot 248. The liquid permeable material 226 extends from the slot 248 and wraps around the support member 244. In other words, the liquid permeable material 226 envelops the support member 244 in the form of a sleeve 237. In turn, the liquid permeable material 226 extends along the support member 244 such that the support member 244 supports the liquid permeable material 226 against the exhaust flow. According to the exemplary embodiment, the sleeve 237 wraps tightly around the support member 244, rather than hanging loosely from the support member 244. The liquid permeable material 226 and the support member 244 extend toward a sieve outlet 254. According to the exemplary embodiment, the sieve inlet 250 extends along a longitudinal length of the support member 244 and the sieve outlet 254 is at a longitudinal end portion of the liquid permeable material 226. However, it will be appreciated that the sieve inlet and outlet 250, 254 may alternatively include or additionally include further structure, which may define, respectively, the inlet and outlet.

The wet electrostatic precipitator 210 further includes a liquid collector 256 positioned proximate to the sieve outlets 254 for collecting the liquid being discharged from the sieve outlets 254. According to the exemplary embodiment, the liquid collector 256 is in the form of a tray 256 that includes a bottom 258 and surrounding sidewalls 260 configured to guide the liquid to the liquid treatment system 62 as discussed above in greater detail.

In use, the exemplary embodiments of the wet electrostatic precipitator 10 includes the plurality of sieves 24 for treating the exhaust as shown in FIGS. 1-5A. As such, the exhaust passes through the duct 12 from the duct inlet 20 to the duct outlet 22 in the three stage process as shown in FIG. 1, but with additional reference being made to the sieves 24, liquid collector 56, and liquid treatment system 62 shown in FIGS. 2-5A. However, it will be appreciated that this use applies similarly to the additional embodiments discussed above in greater detail, such as those shown in FIGS. 5B, 6, and 7.

With respect to FIGS. 1-5A, the liquid, such as water or alkali solution, is directed from the liquid supply via the pump 64 and into the liquid supply conduit 46. Because the liquid permeable material 26 extends through slot 48 and into the liquid supply conduit 46, the liquid absorbs into the liquid permeable material 26 and passes through the sieve inlet 50 along the remainder of the sieve 24. More specifically, the liquid flows along the liquid permeable material 26 from the sieve inlet 50 toward the sieve outlet 54. According to the exemplary embodiment, such liquid flow along each of the sieves 24 occurs generally simultaneously in each of the first, second, and third stages of treatment. However, it will be appreciated that each stage may be operated at different or like times and/or with different or like liquids depending on the treatment.

While the liquid flows along the sieve 24, the exhaust from the industrial process enters the flow chamber 14 through the duct inlet 20 and initially impacts the first portion 30 of the plurality of sieves 24 during the first stage of treatment. Specifically, the particulate emissions carried within the exhaust directly impact the liquid flowing along the liquid permeable material 26 and collect on the liquid permeable material 26 in order to remove the particulate emissions from the exhaust. In turn, the liquid continues to flow along the liquid permeable material 26 and guide the particulate emissions that accumulate thereon toward the sieve outlet 54. The liquid flow continually cleanses the liquid permeable material 26 during use for additional accumulation and removal of particulate emissions. According to the exemplary embodiment, the first stage also acts as a scrubber and, as such, the liquid is particularly configured for treating the exhaust. For example, the liquid may comprise a scrubbing chemical such as an alkali solution that reacts with the contents of the exhaust for scrubbing the exhaust within the wet electrostatic precipitator 10. During some exemplary treatments, the particulate emissions may be pre-charged by one or more discharge electrodes prior to entering the first stage.

The exhaust flowing into and around the plurality of sieves 24 has an elevated temperature relative to the liquid flowing along the liquid permeable material 26. For example, the temperature of the exhaust entering the duct inlet 20 may be greater than 130° F., such as between approximately 130° F. and approximately 350° F. As such, the first portion 30 of the plurality of sieves 24 may be formed from materials, such as those discussed above, configured to survive and operate within relatively high temperatures and corrosive gas. Furthermore, the first portion 30 may be configured to operate as a heat exchanger and/or scrubber for lowering the exhaust temperatures for subsequent stages. The temperature of the hot gases is lowered by heat transfer and condensation or evaporation; liquid will evaporate if the gases are hot and unsaturated; and condensation will occur when the gases become saturated due to cooling. According to an exemplary embodiment, the exhaust tends to reduce in temperature to an operating temperature of approximately 130° F. within the flow chamber 14 in the presence of the cooler liquid, which absorbs at least a portion of the excess thermal energy from the exhaust. According to the exemplary embodiment, the exhaust also includes an amount of liquid vapor, such as water vapor, that condenses on the liquid permeable material 26 in the form of condensate. The condensate and liquid flowing toward the sieve outlet 54 thereby collect accumulated particulate emissions and thermal energy for completing the first stage of treating the exhaust. By way of example, the condensation may be desirable for reducing a volume of flue gas to be treated in subsequent stages, conserving liquid by reuse, and a reduction in $CO_2$ emissions.

During the second stage of treatment, the first stage is effectively repeated; however, the second stage further includes treatment via the plurality of discharge electrodes 36. More specifically, the second portion 32 of the plurality of sieves 24 is electrically grounded, the plurality of discharge electrodes 36 is electrically connected to the current source for generating the high voltage electrical field therebetween. The high voltage electrical field generates charged particles that attach to particulate emissions within the exhaust. In turn, the charge particulate emissions become attracted to the electrically grounded sieves 24 for further removal of particulate emissions from the exhaust and accumulation on the liquid permeable material 26. Condensation of water vapor is expected to occur in the $2^{nd}$ and $3^{rd}$ stages of treatment.

The third stage of treatment effectively repeats the first stage of treatment via the third portion 34 of the plurality of sieves 24 positioned proximate to the duct inlet 20 and downstream of the first and second portions 30, 32, respectively. As such, the third stage is configured to produce a final removal of the particulate and gaseous emissions and thermal energy before discharging the treated exhaust to the environment or other location in the industrial process. It will be appreciated that the first, second, and third stages may be practiced alone or in any combination with each other for treating exhaust. For example, the plurality of sieves 24 may be used solely for particulate collection by impaction or electrostatic precipitation, scrubbing, or for thermal energy recovery.

With respect to the first, second, and third stages, the liquid, alone or in combination with the condensate, discharges from the sieve outlet 54 and into the tray 56, which directs the liquid toward the liquid treatment system 62. The pump 64 forces the liquid through the filtration system 66, which removes the particulate emissions from the liquid, and into the heat exchanger 68. The heat exchanger 68 then recovers thermal energy from the liquid for any variety of uses as will be appreciated by those of ordinary skill in the art to improve the efficiency of the industrial process. Once the liquid treatment system 62 removes and recovers the particulate emissions and the thermal energy from the liquid, the liquid is redirected back into the liquid supply conduit 46 for reuse. Alternatively, some or all of the liquid may be disposed of and additional liquid from the liquid supply may be directed into the liquid supply conduit 46 for continued treatment of the exhaust.

Figure 11:
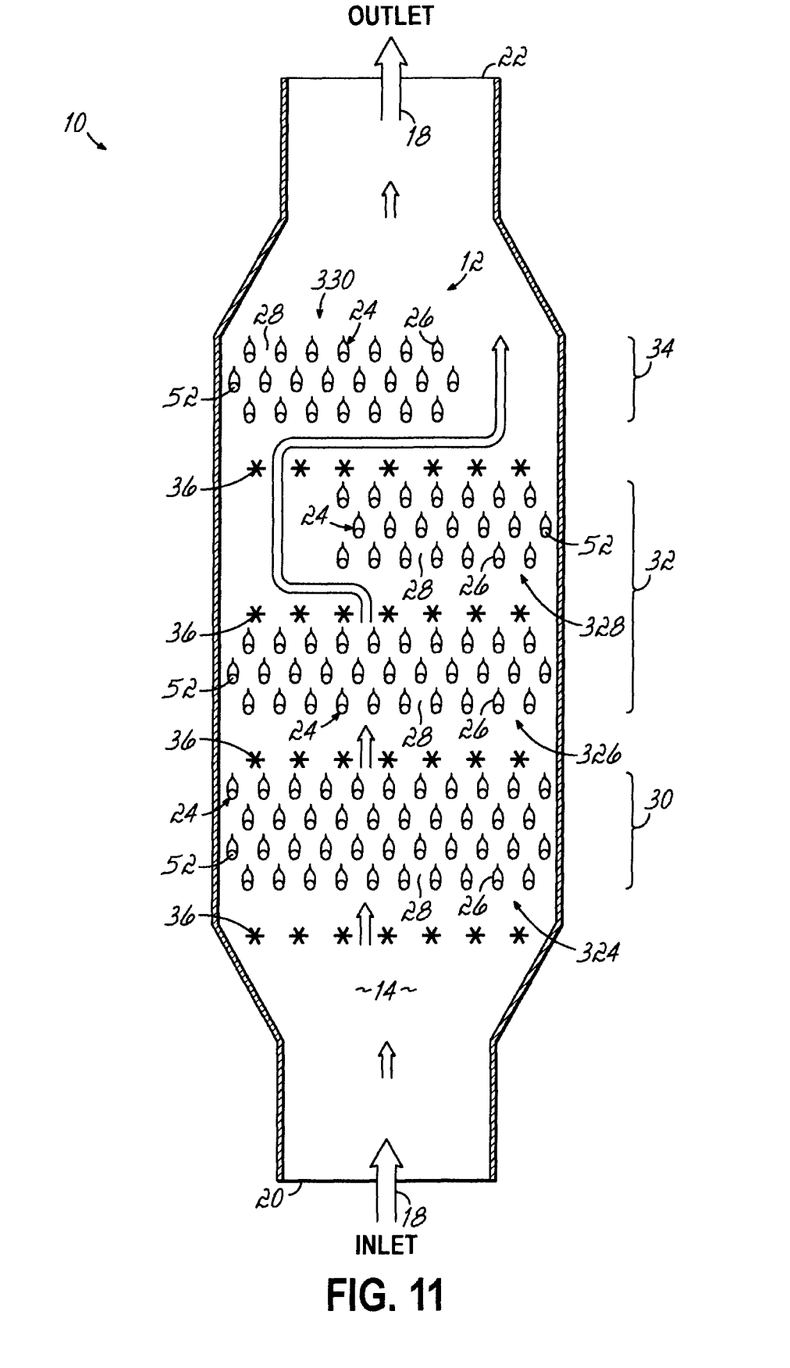
FIG. 11 is a schematic cross-sectional view of an electrostatic precipitator according to the invention.

To improve the charging of the particulates and improve their capture, some "partial sieve assemblies" may be added in series to provide a bypass path for the gases. This is shown in FIG. 11, where two sieve assemblies 324 and 326 extend across the entire flow path and two of the sieve assemblies 328 and 330 extend only partially across the flow path so some of the gases are forced to flow in a zig-zag pattern across the discharge electrodes as shown by arrows 18. The path crosses a series of discharge electrodes 36. The open section can be at the top or bottom of the ESP, or one of the two sides (as shown in FIG. 11). This arrangement can improve particulate charging and capture.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination. For example, sleeves of different cross-sections can be used in different parts of the ESP. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A wet electrostatic precipitator for reducing particulate and gaseous emissions from an exhaust, comprising;
  a flow chamber defining a flow path therethrough; and
  a plurality of sieves positioned within said flow chamber and arranged relative to each other to define a plurality of gaps therebetween for receiving the exhaust therethrough, each of said sieves including a liquid permeable material extending therealong, said liquid permeable material configured to receive a liquid such that the liquid flows along said liquid permeable material for treating the exhaust;
  wherein said plurality of sieves relative to one another provides at least one row of sieves that extends perpendicular to said flow path within said flow chamber, with the liquid permeable material of each sieve having a portion thereof providing a surface for capture of particulate emissions by being positioned to be directly impacted by oncoming exhaust along the flow path that is perpendicular to the at least one row of sieves.

2. The wet electrostatic precipitator of claim 1, wherein each of said plurality of sieves includes an inlet for receiving the liquid and an outlet for discharging the liquid and further comprises:
  a liquid collector positioned proximate to said outlet of each of said plurality of sieves and configured to collect the liquid therefrom.

3. The wet electrostatic precipitator of claim 2, further comprising:
  a heat exchanger fluidly connected to said liquid collector and configured to receive the liquid from said liquid collector after having been heated by the exhaust to recover a thermal energy therefrom.

4. The wet electrostatic precipitator of claim 2, wherein said plurality of sieves are configured to generate a condensate from the exhaust, and the liquid and the condensate flow together into said liquid collector, and the wet electrostatic precipitator further comprises:
  a pump fluidly connected to said liquid collector and said inlet of said plurality of sieves such that said pump directs the liquid and the condensate from said liquid collector to said inlet for reuse.

5. The wet electrostatic precipitator of claim 1, wherein said liquid permeable material is exposed to said flow path within said flow chamber such that the exhaust flowing therethrough directly contacts said liquid permeable material.

6. The wet electrostatic precipitator of claim 1, wherein said plurality of sieves is electrically grounded and further comprises:
  a plurality of discharge electrodes positioned proximate to said plurality of sieves and electrically connected to a current supply such that said plurality of discharge electrodes charge a plurality of particulates with a plurality of charged particles flowing with the exhaust for accumulating the charged plurality of particulates on the plurality of sieves.

7. A sieve assembly for treating an exhaust, comprising;
  a plurality of sieves arranged relative to each other to define a plurality of gaps therebetween for receiving the exhaust therethrough, each of said sieves including a liquid permeable material extending therealonq, said liquid permeable material configured to receive a liquid such that the liquid flows along said liquid permeable material for treating the exhaust, and
  wherein said plurality of sieves relative to one another provides at least one row of sieves that extends perpendicular to a flow path of the exhaust, with the liquid permeable material of each sieve having a portion thereof providing a surface for capture of particulate emissions by being positioned to be directly impacted by oncoming exhaust along the flow path that is perpendicular to the at least one row of sieves.

8. The sieve assembly of claim 7, further comprising:
a support member defining a liquid supply conduit configured to receive the liquid, said plurality of sieves projecting from said support member such that said liquid permeable material of each sieve is fluidly connected to said liquid supply conduit to receive the liquid and configured to be oriented generally vertically during treatment.

9. The sieve assembly of claim 8, wherein said support member is an elongate tube, said elongate tube has an elongate slot extending therealong in fluid communication with said liquid supply conduit therein, and said elongate slot receives said liquid permeable material of each sieve such that the liquid flows therethrough and along said liquid permeable material.

10. The sieve assembly of claim 8, wherein each of said plurality of sieves includes a frame member connected to and extending from said support member, each said frame member being operatively connected to said liquid permeable material to further support said liquid permeable material against exhaust flowing thereagainst.

11. The sieve assembly of claim 10, wherein said liquid permeable material is wrapped about said frame member to further support said liquid permeable material thereon.

12. The sieve assembly of claim 10, wherein said frame member includes a cable connected to said support member, and said liquid permeable material is wrapped about said cable to further support said liquid permeable material thereon.

13. The sieve assembly of claim 7, further comprising:
a support member defining a liquid supply conduit configured to receive the liquid, said plurality of sieves projecting from said support member such that said liquid permeable material of each sieve is fluidly connected to said liquid supply conduit to receive the liquid and configured to be oriented generally horizontally during treatment.

14. The sieve assembly of claim 13, wherein each of said plurality of sieves includes an elongate tube having an elongate slot extending therealong, said elongate slot of each sieve is in fluid communication with a sieve chamber of each respective sieve to receive said liquid permeable material of each respective sieve such that the liquid flows therethrough and along said liquid permeable material.

15. The sieve assembly of claim 7, wherein said liquid permeable material of each of said plurality of sieves defines a sleeve, and at least a portion of said sleeve is hollow.

16. The sieve assembly of claim 7, wherein each of said plurality of sieves includes a core, said liquid permeable material generally surrounds at least a portion of said core, and said core supports said liquid permeable material.

17. The sieve assembly of claim 7, wherein said liquid permeable material is in the form of an elongated cordage.

18. The sieve assembly of claim 7, further comprising:
a first support member and a second support member positioned offset from said first support member, said liquid permeable material for each of said plurality of sieves extending from said first support member to said second support member, wherein said liquid permeable material is held in tension between said first and second support members.

19. A method of treating an exhaust with a plurality of sieves arranged relative to each other to define a plurality of gaps therebetween for receiving the exhaust therethrough and wherein said plurality of sieves relative to one another provides at least one row of sieves that extends perpendicular to a flow path of the exhaust, each of the sieves including a liquid permeable material extending therealong, the liquid permeable material configured to receive a liquid such that the liquid flows along the liquid permeable material for treating the exhaust, comprising;
directing the exhaust toward the plurality of sieves;
flowing the liquid to the liquid permeable material;
absorbing the liquid within the liquid permeable material;
permeating the liquid along the liquid permeable material such that the liquid flows along the liquid permeable material; and
impacting the exhaust against the liquid flowing along the liquid permeable material in order to treat the exhaust.

20. The method of claim 19, further comprising:
transferring a thermal energy from the exhaust to the liquid flowing along the liquid permeable material;
reducing a temperature of the exhaust and increasing a temperature of the liquid, thereby resulting in an increased temperature;
collecting the liquid with the increased temperature and directing the liquid with the increased temperature through a heat exchanger; and
recovering at least a portion of the thermal energy from the liquid with the increased temperature via the heat exchanger.

21. The method of claim 19 wherein the plurality of sieves each includes an inlet and an outlet, further comprising:
collecting the liquid flowing from the outlet of the plurality of sieves, to thus provide a collected liquid; and
pumping the collected liquid to the inlet such that the collected liquid again flows along the liquid permeable material for treating the exhaust.

22. The method of claim 19, further comprising:
adding a scrubbing chemical to the liquid such that the scrubbing chemical and the liquid flow along the liquid permeable material for treating the exhaust.

23. The method of claim 19, further comprising:
electrically grounding the plurality of sieves;
electrically powering a plurality of discharge electrodes proximate to the plurality of sieves;
electrically charging a plurality of particulates with a plurality of particles within the exhaust, to provide a charged plurality of particles; and
accumulating the charged plurality of particulates on the plurality of sieves.

24. A wet electrostatic precipitator for reducing particulate and gaseous emissions from an exhaust, comprising;
a flow chamber defining a flow path therethrough; and
a plurality of sieves positioned within said flow chamber and arranged relative to each other to define a plurality of gaps therebetween for receiving the exhaust therethrough, each of said sieves including a liquid permeable material extending therealong, said liquid permeable material configured to receive a liquid such that the liquid flows along said liquid permeable material for treating the exhaust;
wherein the arrangement of said plurality of sieves relative to one another provides at least one row of sieves that extends perpendicular to said flow path within said flow chamber; and
wherein the liquid permeable material either is supported by a frame member, or surrounds at least a portion of a core, or is in the form of elongated cordage.

* * * * *

UNITED STATES PATENT AND TRADEMARK OFFICE
CERTIFICATE OF CORRECTION

PATENT NO. : 10,799,884 B2
APPLICATION NO. : 15/518523
DATED : October 13, 2020
INVENTOR(S) : Khairul Alam et al.

It is certified that error appears in the above-identified patent and that said Letters Patent is hereby corrected as shown below:

On the Title Page

Item [57], Line 2 of Abstract, "includes" should read --include--.

In the Specification

Column 1, Lines 17-18, "method of treating an exhaust, and more particularly," should read --method of treating an exhaust and, more particularly,--.

Column 4, Line 12, "accumulates" should read --accumulate--.

Column 4, Line 17, "that the any number of sieve" should read --that any number of sieves--.

Column 5, Line 1, "(See FIG. 3)" should read --(see FIG. 3)--.

Column 5, Line 34, "The exemplary embodiment," should read --In the exemplary embodiment,--.

Column 9, Line 41, "includes" should read --include--.

Column 10, Line 65, "charge particulate" should read --charged particulate--.

In the Claims

Column 11, Line 64, Claim 1, "comprising;" should read --comprising:--.

Column 12, Line 52, Claim 7, "comprising;" should read --comprising:--.

Column 12, Line 56, Claim 7, "therealonq," should read --therealong--.

Signed and Sealed this
Twenty-ninth Day of December, 2020

Andrei Iancu
*Director of the United States Patent and Trademark Office*

CERTIFICATE OF CORRECTION (continued)
U.S. Pat. No. 10,799,884 B2

Column 14, Line 6, Claim 19, "comprising;" should read --comprising:--.

Column 14, Line 48, Claim 24, "comprising;" should read --comprising:--.